US010590231B2

(12) United States Patent
Otero Martinez et al.

(10) Patent No.: US 10,590,231 B2
(45) Date of Patent: Mar. 17, 2020

(54) POLYURETHANES WITH REDUCED ALDEHYDE EMISSION

(71) Applicant: BASF SE, Ludwigshafen am Rhein (DE)

(72) Inventors: Iran Otero Martinez, Stemwede (DE); Sirus Zarbakhsh, Limburgerhof (DE)

(73) Assignee: BASF SE, Ludwigshafen am Rhein (DE)

( * ) Notice: Subject to any disclaimer, the term of this patent is extended or adjusted under 35 U.S.C. 154(b) by 76 days.

(21) Appl. No.: 15/576,370

(22) PCT Filed: Apr. 19, 2016

(86) PCT No.: PCT/EP2016/058629
§ 371 (c)(1),
(2) Date: Nov. 22, 2017

(87) PCT Pub. No.: WO2016/188675
PCT Pub. Date: Dec. 1, 2016

(65) Prior Publication Data
US 2018/0155487 A1 Jun. 7, 2018
US 2018/0371152 A9 Dec. 27, 2018

(30) Foreign Application Priority Data
May 28, 2015 (EP) .................................... 15169712

(51) Int. Cl.
C08G 18/79 (2006.01)
C08G 18/76 (2006.01)
C08G 18/48 (2006.01)
C08G 18/50 (2006.01)
C08G 101/00 (2006.01)

(52) U.S. Cl.
CPC ......... *C08G 18/797* (2013.01); *C08G 18/482* (2013.01); *C08G 18/4812* (2013.01); *C08G 18/4837* (2013.01); *C08G 18/4887* (2013.01); *C08G 18/5024* (2013.01); *C08G 18/7664* (2013.01); *C08G 2101/0083* (2013.01); *C08J 2375/04* (2013.01)

(58) Field of Classification Search
CPC .. C08G 18/18; C08G 18/4812; C08G 18/482; C08G 18/4837; C08G 18/4887; C08G 18/5024; C08G 18/7664; C08G 18/797; C08G 2101/0083; C08J 2375/04
See application file for complete search history.

(56) References Cited
U.S. PATENT DOCUMENTS

| 3,304,273 | A | 2/1967 | Stamberger |
| 3,383,351 | A | 5/1968 | Stamberger |
| 3,523,093 | A | 8/1970 | Stamberger |
| 4,477,589 | A | 10/1984 | Van Der Hulst |
| 4,536,522 | A | 8/1985 | Grigsby, Jr. et al. |
| 4,940,632 | A | 7/1990 | Nicola et al. |
| 5,506,275 | A | 4/1996 | Valoppi |
| 6,136,876 | A * | 10/2000 | Meier ............... C08G 18/089 521/112 |
| 2006/0141236 | A1 | 6/2006 | Nakamura et al. |
| 2008/0194718 | A1 | 8/2008 | Schuster et al. |
| 2009/0227758 | A1 | 9/2009 | Miyazaki |
| 2009/0326089 | A1* | 12/2009 | Haas ............... C08G 18/1825 521/128 |
| 2013/0203880 | A1 | 8/2013 | George et al. |
| 2016/0137814 | A1 | 5/2016 | Otero Martinez et al. |
| 2016/0304686 | A1 | 10/2016 | Otero Martinez et al. |
| 2016/0304687 | A1 | 10/2016 | Otero Martinez |

FOREIGN PATENT DOCUMENTS

| CN | 105061745 | * 11/2015 |
| DE | 111394 C | 7/1899 |
| DE | 1152536 B | 8/1963 |
| DE | 1152537 B | 8/1963 |
| EP | 0090444 A2 | 10/1983 |
| EP | 0364854 A2 | 4/1990 |
| EP | 0374932 A1 | 6/1990 |
| EP | 0629607 A2 | 12/1994 |
| EP | 0897402 A1 | 2/1999 |
| EP | 0989146 A1 | 3/2000 |
| EP | 1002816 A2 | 5/2000 |
| EP | 1428847 A1 | 6/2004 |
| EP | 1460094 A1 | 9/2004 |
| EP | 1529792 A1 | 5/2005 |
| EP | 1888664 A2 | 2/2008 |
| WO | 9413725 A1 | 6/1994 |
| WO | 2005010124 A3 | 7/2005 |
| WO | 2005010955 A3 | 8/2005 |
| WO | 2005090440 A1 | 9/2005 |
| WO | 2006/034800 A1 | 4/2006 |
| WO | 2006/042674 A1 | 4/2006 |
| WO | 2008055952 A1 | 5/2008 |
| WO | 2009128279 A1 | 10/2009 |
| WO | 2013116092 A1 | 8/2013 |
| WO | 2015/036210 A1 | 3/2015 |
| WO | 2015071063 A1 | 5/2015 |
| WO | 2015/082316 A1 | 6/2015 |
| WO | 2015/189095 A1 | 12/2015 |
| WO | 2016/083538 A1 | 6/2016 |
| WO | 2016/166008 A1 | 10/2016 |

OTHER PUBLICATIONS

European Search Report for EP Patent Application No. 15169712.5, Completed on Nov. 24, 2015, 3 pages.
International Search Report for International Application No. PCT/EP2016/058629, dated Jun. 27, 2016, 2 pages.

* cited by examiner

Primary Examiner — John M Cooney
(74) Attorney, Agent, or Firm — Armstrong Teasdale LLP

(57) ABSTRACT

Provided herein is a process for the production of polyurethanes with reduced aldehyde emission, wherein a CH-acidic compound which has one or more alkylene oxide units is added to the reaction mixture for the production of the polyurethane. Further provided herein are polyurethanes produced by this process and to the use of these polyurethanes in the interior of means of transport.

15 Claims, No Drawings

POLYURETHANES WITH REDUCED ALDEHYDE EMISSION

CROSS-REFERENCE TO RELATED APPLICATIONS

This application is the national stage entry of PCT/EP2016/058629, filed on Apr. 19, 2016, which claims the benefit of priority to European Patent Application No. 15169712.5, filed May 28, 2015, which is incorporated by reference in its entirety herein.

FIELD OF THE INVENTION

The present invention relates to a process for the production of polyurethanes where (a) polyisocyanate, (b) polymeric compounds having groups reactive toward isocyanates, (c) catalysts, (d) a CH-acidic compound of the general formula (1)

formula (1)

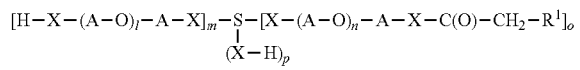

where H— is hydrogen, —X— is mutually independently oxygen or a —NH— group, —A— is mutually independently a linear or branched-chain aliphatic or aromatic hydrocarbon moiety having from 2 to 20 carbon atoms, —O— is oxygen, S is an aliphatic, cycloaliphatic or aromatic, linear or branched-chain hydrocarbon moiety which can have substitution, —C(O)— is a carbonyl moiety, —CH$_2$— is a methylene moiety, R$^1$ is NO$_2$ or an electron-withdrawing moiety of the general formula —C(O)—R$^2$, and R$^2$ is mutually independently a moiety selected from the group consisting of H, —NH$_2$, —NH—R$^3$—NR$^4$R$^5$, OR$^6$ or R$^7$, where R$^3$, R$^4$, R$^5$, R$^6$ and R$^7$ independently are selected from the group consisting of aliphatic, araliphatic or aromatic hydrocarbons, which may have substitution, and l and n are mutually independently integers from 0 to 200, m is integers from 0 to 7 and o is integers from 1 to 8 and p is integers from 0 to 7, with the proviso that the sum of m, o and p is not greater than 8, and optionally (e) blowing agent, (f) chain extender and or crosslinking agent, and (g) auxiliaries and/or additives are mixed to give a reaction mixture, and the reaction mixture is allowed to complete a reaction to give the polyurethane. The present invention further relates to polyurethanes produced by this process and to the use of these polyurethanes in the interior of means of transport.

BACKGROUND

Polyurethanes are versatile, being used by way of example as seat cushioning in the furniture industry and as binders for particleboard, as insulation material in the construction industry, as insulation material by way of example for pipes, hot-water tanks, and refrigerators, and as cladding components, for example in vehicle construction. In particular, polyurethanes are frequently used in automobile construction, for example in the external cladding of automobiles as spoilers, roof elements, and springing elements, and also in the interior cladding of automobiles as roof cladding, carpet-backing foam, door cladding, steering rings, control knobs, and seat cushioning.

In this context it is known that polyurethanes tend to emit organic substances which can cause unpleasant odors or, in the event of high concentration, can cause health-related problems.

Enclosed spaces are in particular affected here, for example in the interiors of buildings or of vehicles such as automobiles. An example of these emissions is emission of aldehydes. Various attempts have already been made to reduce these aldehyde emissions: by way of example, EP 1428847 says that aldehyde emissions can be reduced by adding polymeric substances having primary and/or secondary amino groups.

By way of example EP 1428847 says that aldehyde emissions can be reduced by subsequently adding polymeric substances having primary and/or secondary amino groups. Responsible for the reduction in emissions are the amine groups in the polymer. Since they are isocyanate-reactive and are very largely deactivated by reaction with the isocyanate, the polymeric active ingredient ought to be given to the foam already produced. A disadvantage here is a complex process with an additional step of aftertreatment of the foam. There is no possibility for use in compact systems or closed-cell foams.

US 2006/0141236 describes the use of hydrazine compounds as aldehyde scavengers in polyurethanes. In this case the active substance is introduced directly into the polyol component. Hydrazines and hydrazine derivatives, however, have a catalytic activity and may influence the polyurethane reaction. Moreover, only a low level of reduction in aldehyde emissions is obtained, of around 60%.

US 20130203880 describes the use of polyhydrazodicarbonamide as a substance for reducing aldehyde emissions in polyurethane foams. A significant reduction in aldehydes is achieved, however, only when the amount of polyhydrazodicarbonamide added is large, being from 2 to 5.5% by weight in the polyol component. Since polyhydrazodicarbonamide likewise has catalytic properties, the reaction profile is altered through the addition of this substance in this order of magnitude.

DESCRIPTION

It was an object of the present invention to provide polyurethanes, in particular polyurethane foams, which exhibit reduced aldehyde emission. A particular intention was to show a long-lasting activity for the substances responsible for reduced aldehyde emission, and to cause no additional emissions on the part of the polyurethane. Moreover, the low-emission polyurethane foams are to be capable of being produced by a simple method, which allows for the substances responsible for reducing the aldehyde emissions to be added directly to the reaction mixture for producing the polyurethane. The intention here is in particular to use substances which are inexpensive and easy to handle, and which do not impair the production of the polyurethanes.

Surprisingly, the object of the invention has been achieved via a process for the production of polyurethanes where (a) polyisocyanate, (b) polymeric compounds having groups reactive toward isocyanates, (c) catalysts, (d) a CH-acidic compound of the general formula (1)

formula (1)

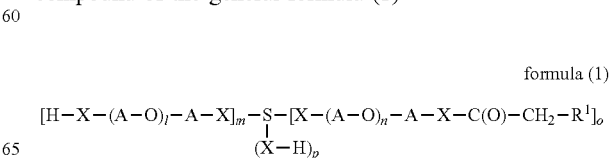

where H— is hydrogen, —X— is mutually independently oxygen or a —NH— group, -A- is mutually independently a linear or branched-chain aliphatic or aromatic hydrocarbon moiety having from 2 to 20 carbon atoms, —O— is oxygen, S is an aliphatic, cycloaliphatic or aromatic, linear or branched-chain hydrocarbon moiety which can have substitution, —C(O)— is a carbonyl moiety, —CH$_2$— is a methylene moiety, R$^1$ is NO$_2$ or an electron-withdrawing moiety of the general formula —C(O)—R$^2$, and R$^2$ is mutually independently a moiety selected from the group consisting of H, —NH$_2$, —NH—R$^3$—NR$^4$R$^5$, OR$^6$ or R$^7$, where R$^3$, R$^4$, R$^5$, R$^6$ and R$^7$ independently are selected from the group consisting of aliphatic, araliphatic or aromatic hydrocarbons, which may have substitution, and I and n are mutually independently integers from 0 to 200, m is integers from 0 to 7 and o is integers from 1 to 8 and p is integers from 0 to 7, with the proviso that the sum of m, o and p is not greater than 8, and optionally (e) blowing agent, (f) chain extender and or crosslinking agent, and (g) auxiliaries and/or additives are mixed to give a reaction mixture, and the reaction mixture is allowed to complete a reaction to give the polyurethane.

For the purposes of the invention, the term polyurethane comprises all of the known polyisocyanate polyaddition products. These comprise adducts of isocyanate and alcohol, and also comprise modified polyurethanes which can comprise isocyanurate structures, allophanate structures, urea structures, carbodiimide structures, uretonimine structures, biuret structures, and other isocyanate adducts. In particular, these polyurethanes of the invention comprise compact polyisocyanate polyaddition products, for example thermosets, and foams based on polyisocyanate polyaddition products, for example flexible foams, semirigid foams, rigid foams, and integral foams, and also polyurethane coatings and binders. For the purposes of the invention, the term polyurethanes moreover includes polymer blends comprising polyurethanes and other polymers, and also foams made of said polymer blends. It is preferable that the polyurethanes of the invention are polyurethane foams or compact polyurethanes which comprise no polymers other than the polyurethane units (a) to (g) explained hereinafter.

For the purposes of the invention, the term polyurethane foams use foams in accordance with DIN 7726. The compressive stress value for 10% compression, or compressive strength in accordance with DIN 53 421/DIN EN ISO 604 of flexible polyurethane foams of the invention here is 15 kPa or less, preferably from 1 to 14 kPa, and in particular from 4 to 14 kPa. The compressive stress value for 10% compression in accordance with DIN 53 421/DIN EN ISO 604 of semirigid polyurethane foams of the invention is from more than 15 kPa to less than 80 kPa. The open-cell factor of semirigid polyurethane foams and flexible polyurethane foams of the invention in accordance with DIN ISO 4590 is preferably greater than 85%, particularly preferably greater than 90%. Further details relating to flexible polyurethane foams and semirigid polyurethane foams of the invention can be found in "Kunststoffhandbuch [Plastics handbook], volume 7, Polyurethane [Polyurethanes]", Carl Hanser Verlag, 3$^{rd}$ edition 1993, chapter 5.

The compressive stress value for 10% compression of rigid polyurethane foams of the invention is greater than or equal to 80 kPa, preferably greater than or equal to 120 kPa, particularly preferably greater than or equal to 150 kPa. The closed-cell factor of the rigid polyurethane foam in accordance with DIN ISO 4590 is moreover more than 80%, preferably more than 90%. Further details relating to rigid polyurethane foams of the invention can be found in "Kunststoffhandbuch [Plastics handbook], volume 7, Polyurethane [Polyurethanes]", Carl Hanser Verlag, 3$^{rd}$ edition 1993, chapter 6.

For the purposes of this invention, the term elastomeric polyurethane foams means polyurethane foams in accordance with DIN 7726 which after brief deformation by 50% of thickness in accordance with DIN 53 577 after 10 minutes exhibit no residual deformation exceeding 2% of their initial thickness. This can apply to a rigid polyurethane foam, a semirigid polyurethane foam, or a flexible polyurethane foam.

Integral polyurethane foams are polyurethane foams in accordance with DIN 7726 with a marginal zone which, as a result of the shaping process, has higher density than the core. The overall apparent density averaged over the core and the marginal zone here is preferably above 100 g/L. Again, integral polyurethane foams for the purposes of the invention can be rigid polyurethane foams, semirigid polyurethane foams, or flexible polyurethane foams. Further details relating to integral polyurethane foams of the invention can be found in "Kunststoffhandbuch [Plastics handbook], volume 7, Polyurethane [Polyurethanes]", Carl Hanser Verlag, 3$^{rd}$ edition 1993, chapter 7.

The polyurethanes of the invention are obtained here in that polyisocyanates (a) are mixed with polymeric compounds (b) having groups reactive toward isocyanates, optionally catalysts (c), CH-acidic compounds (d), and optionally blowing agent (e), chain extender (f), and other auxiliaries and additives (g) to give a reaction mixture, and allowing completion of a reaction.

In a preferred embodiment, the polyurethane of the invention here is a polyurethane foam with an average density of 20 to 850 g/L, preferably a semirigid polyurethane foam, or a flexible polyurethane foam, or a rigid polyurethane foam, particularly preferably an elastomeric flexible polyurethane foam, a semirigid polyurethane foam, or an elastomeric integral polyurethane foam. It is preferable that the density of the elastomeric integral polyurethane foam averaged over the core and the marginal zone is from 150 to 500 g/L. It is preferable that the average density of the flexible polyurethane foam is from 10 to 100 g/L. It is preferable that the average density of the semirigid polyurethane foam is from 70 to 150 g/L.

In another preferred embodiment, the polyurethane is a compact polyurethane with a density that is preferably more than 850 g/L, preferably from 900 to 1400 g/L, and particularly preferably from 1000 to 1300 g/L. A compact polyurethane is obtained here without addition of a blowing agent. Small quantities of blowing agent, for example water, comprised in the polyols as a result of a production process are not counted as blowing agent here. It is preferable that the reaction mixture for the production of the compact polyurethane comprises less than 0.2% by weight of water, particularly less than 0.1% by weight, and in particular less than 0.05% by weight.

The polyurethane of the invention is preferably used here in the interior of means of transport, for example ships, aircraft, trucks, cars, or buses, particularly cars or buses, and in particular cars. The term automobile interior is used hereinafter for the interior of cars and buses. It is possible here to use a flexible polyurethane foam as seat cushion, a semirigid polyurethane foam as foam backing of door side elements or of instrument panels, an integral polyurethane foam as steering wheel, control knob, or headrest, and a compact polyurethane by way of example as cable-sheathing.

The polyisocyanate components (a) used for the production of the polyurethanes of the invention comprise any of the polyisocyanates known for the production of polyurethanes. These comprise the aliphatic, cycloaliphatic, and aromatic difunctional or polyfunctional isocyanates known from the prior art, and also any desired mixtures thereof. Examples are diphenylmethane 2, 2'-, 2,4'-, and 4,4'-diisocyanate, the mixtures of monomeric diphenylmethane diisocyanates with diphenylmethane diisocyanate homologs having a larger number of rings (polymer MDI), isophorone diisocyanate (IPDI) and its oligomers, tolylene 2,4- and 2,6-diisocyanate (TDI), and mixtures of these, tetramethylene diisocyanate and its oligomers, hexamethylene diisocyanate (HDI) and its oligomers, naphthylene diisocyanate (NDI), and mixtures thereof.

It is preferably to use tolylene 2,4- and/or 2,6-diisocynate (TDI) or a mixture thereof, monomeric diphenylmethane diisocyanates, and/or diphenylmethane diisocyanate homologs having a larger number of rings (polymer MDI), and mixtures of these. Other possible isocyanates are mentioned by way of example in "Kunststoffhandbuch [Plastics handbook], volume 7, Polyurethane [Polyurethanes]", Carl Hanser Verlag, 3$^{rd}$ edition 1993, chapter 3.2 and 3.3.2.

Polyisocyanate component (a) used can take the form of polyisocyanate prepolymers. These polyisocyanates prepolymers are obtainable by reacting the polyisocyanates described above (constituent (a-1)) in excess, for example at temperatures of from 30 to 100° C., preferably at about 80° C., with polymeric compounds (b) (constituent (a-2)), having groups reactive toward isocyanates, and/or with chain extenders (c) (constituent (a-3)) to give the isocyanate prepolymer.

Polymeric compounds (a-2) having groups reactive toward isocyanates, and chain extenders (a-3), are known to the person skilled in the art and are described by way of example in "Kunststoffhandbuch [Plastics handbook], volume 7, Polyurethane [Polyurethanes]", Carl Hanser Verlag, 3$^{rd}$ edition 1993, chapter 3.1: by way of example, it is also possible to use, as polymeric compounds (a-2) having groups reactive toward isocyanates, the polymeric compounds described under (b) having groups reactive toward isocyanates.

Polymeric compounds (b) which have groups reactive toward isocyanates and which are used are those with functionality from 2 to 8 and with number-average molar mass from 400 to 15 000 g/mol, selected from the group of the polyether polyols, polyester polyols, and mixtures thereof.

Polyetherols are by way of example produced from epoxides, for example propylene oxide and/or ethylene oxide, or from tetrahydrofuran with starter compounds exhibiting hydrogen-activity, for example aliphatic alcohols, phenols, amines, carboxylic acids, water, or compounds based on natural substances, for example sucrose, sorbitol or mannitol, with use of a catalyst. Mention may be made here of basic catalysts and double-metal cyanide catalysts, as described by way of example in PCT/EP2005/010124, EP 90444, or WO 05/090440.

Polyesterols are by way of example produced from aliphatic or aromatic dicarboxylic acids and polyhydric alcohols, polythioether polyols, polyesteramides, hydroxylated polyacetals, and/or hydroxylated aliphatic polycarbonates, preferably in the presence of an esterification catalyst. Other possible polyols are mentioned by way of example in "Kunststoffhandbuch [Plastics handbook], volume 7, Polyurethane [Polyurethanes]", Carl Hanser Verlag, 3$^{rd}$ edition 1993, chapter 3.1.

Other materials that can be used, alongside the polyetherols and polyesterols described, are polyetherols or polyesterols which are also termed polymer polyetherols or polymer polyesterols and which comprise fillers. These compounds preferably comprise dispersed particles made of thermoplastics, for example composed of olefinic monomers such as acrylonitrile, styrene, (meth)acrylates, (meth)acrylic acid, and/or acrylamide. These polyols comprising fillers are known and are obtainable commercially. A production process for these is described by way of example in DE 111 394, U.S. Pat. Nos. 3,304,273, 3,383,351, 3,523,093, DE 1 152 536, DE 1 152 537 WO 2008/055952, and WO 2009/128279.

In a particularly preferred embodiment of the present invention, component (b) comprises polyetherols, and more preferably comprises no polyesterols.

Catalysts (c) greatly accelerate the reaction of the polyols (b) and optionally chain extender and crosslinking agent (f), and also chemical blowing agent (e) with the organic, optionally modified polyisocyanates (a). The catalysts (c) here comprise incorporable amine catalysts. These have at least one, preferably from 1 to 8, and particularly preferably from 1 to 2, groups reactive toward isocyanates, for example primary amine groups, secondary amine groups, hydroxy groups, amides, or urea groups, preferably primary amine groups, secondary amine groups, or hydroxy groups. Incorporable amine catalysts are used mostly for the production of low-emission polyurethanes which are in particular used in the automobile-interior sector. These catalysts are known and are described by way of example in EP1888664. These comprise compounds which preferably comprise, alongside the group(s) reactive toward isocyanates, one or more tertiary amino groups. It is preferable that at least one tertiary amino groups of the incorporable catalysts bears at least two aliphatic hydrocarbon moieties, preferably having from 1 to 10 carbon atoms per moiety, particularly preferably having from 1 to 6 carbon atoms per moiety. It is particularly preferable that the tertiary amino groups bear two moieties selected mutually independently from methyl and ethyl moiety, and also bear another organic moiety. Examples of incorporable catalysts that can be used are bisdimethylaminopropylurea, bis(N,N-dimethylaminoethoxyethyl) carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl)amine, dimethylaminopropylamine, 3-dimethyaminopropyl-N,N-dimethylpropane-1,3-diamine, dimethyl-2-(2-aminoethoxyethanol), and (1,3-bis(dimethylamino)propan-2-ol), N,N-bis(3-dimethylaminopropyl)-N-isopropanolamine, bis(dimethylaminopropyl)-2-hydroxyethylamine, N,N,N-trimethyl-N-(3 aminopropyl)bis(amino-ethyl ether), 3-dimethylaminoisopropyldiisopropanolamine, and mixtures thereof.

It is also possible to use conventional catalysts, alongside the incorporable amine catalysts, to produce the polyurethanes. Mention may be made by way of example of amidines, such as 2,3-dimethyl-3,4,5,6-tetrahydropyrimidine, tertiary amines, such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]-octane, and preferably 1,4-diazabicyclo[2.2.2]octane, and alkanolamine compounds, such as triethanolamine, triisopropanolamine, N-methyl- and N-ethyldiethanolamine, and dimethyl-ethanolamine. It is also possible to use organometallic compounds, preferably organotin compounds, such as tin(II) salts of organic carboxylic acids, e.g. tin(II) acetate, tin(II) octoate, tin(II) ethylhexoate, and tin(II) laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. If component (b) involves an ester, it is preferable to use exclusively amine catalysts. In a particularly preferred embodiment, catalysts (c) used comprise exclusively incorporable catalysts.

If catalysts (c) are used, these can by way of example be used at a concentration of from 0.001 to 5% by weight, in particular from 0.05 to 2% by weight, as catalyst or, respectively, catalyst combination, based on the weight of component (b).

Employed as component (d) are one or more CH-acidic compounds of the general formula (1):

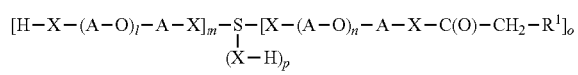

formula (1)

The acidity of the $CH_2$ group here is generated via two electron-withdrawing moieties $R^1$ and the carbonyl group —C(O)—. In the general formula (1), H— mis hydrogen, —X— is mutually independently oxygen or a —NH— group, preferably oxygen, -A-is mutually independently a linear or branched-chain aliphatic or aromatic, preferably aliphatic hydrocarbon moiety having from 2 to 20 carbon atoms, —O— is oxygen, S is an aliphatic, cycloaliphatic or aromatic, linear or branched-chain hydrocarbon moiety which can have substitution, —C(O)— is a carbonyl moiety, —$CH_2$— is a methylene moiety, $R^1$ is $NO_2$ or an electron-withdrawing moiety of the general formula —C(O)—$R^2$, and $R^2$ is mutually independently a moiety selected from the group consisting of H, —$NH_2$, —NH—$R^3$—$NR^4R^5$, $OR^6$ or $R^7$, where $R^3$, $R^4$, $R^5$, $R^6$ and $R^7$ independently are selected from the group consisting of aliphatic, araliphatic or aromatic hydrocarbons, which may have substitution, and I and n are mutually independently integers from 0 to 200, m is integers from 0 to 7, preferably from 0 to 3 and in particular 0, 1 or 2, o is integers from 1 to 8, preferably from 2 to 8 and in particular from 3 to 8, and p is integers from 0 to 7, preferably from 0 to 6 and in particular from 0 to 4, with the proviso that the sum of m, o and p is not greater than 8, particularly preferably from 2 to 8 and in particular 3 or 8. It is preferable that I and n are mutually independently integers of at most 50, particularly preferably at most 10 and in particular at most 5, preferably at least 1, particularly preferably at least 2. The sum of I and n here is preferably at most 50, particularly preferably at most 20 and in particular at most 15 and preferably at least 1 and particularly preferably at least 2. A compound of the formula (1) is a CH-acidic compound if the moieties are as defined above. The pKa of the compound (d) of the invention at 25° C. in water is preferably 0.5 to 16, preferably 8 to 14.0 and more particularly 8 to 13.5.

The meaning of "mutually independently" here is that each one of the general moieties in the structure of the general formula (1) can be freely selected from the group mentioned: it is therefore possible by way of example that each moiety A at every location in the molecule is selected independently, and therefore that by way of example each moiety A is different. That means that by way of example it is also possible that moieties A in the structural unit -(AO)$_n$ can be different in every n unit and that by way of example there is also no necessity that the m moieties [H—X—(A-O)$_l$-A-X]$_m$— or the o moieties —[X-(AO)$_n$-A-X—C(O)—$CH_2$—$R^1$]$_o$ are identical for m and o greater than 1.

It is preferable that -A-O— is mutually independently ethylene oxide, propylene 1,2-oxide, butylene 1,2-oxide or butylene 2,3-oxide. It is particularly preferable that -A-O— is mutually independently ring-opened ethylene oxide or ring-opened propylene 1,2-oxide.

The moiety S can by way of example be a hydrocarbon moiety comprising from 3 to 12 carbon atoms.

The CH-acidic compound (d) is preferably obtainable via esterification of a polyetherol or amidation of a polyetheramine with a compound of the formula (2):

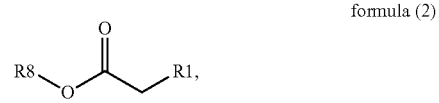

formula (2)

where R1 is as defined above and $R^8$ is an alkyl moiety, preferably a methyl or an ethyl moiety or a propyl moiety.

Independently of one another in each case, the moieties $R^3$, $R^4$, $R^5$, $R^6$ and $R^7$ are preferably each selected from the group consisting of aliphatic hydrocarbons having 1 to 15, preferably 2 to 10, carbon atoms, which may have substitution. Substituents in that case are preferably one or more isocyanate-reactive groups, which preferably comprise isocyanate-reactive hydrogen atoms. Groups of this kind that are isocyanate-reactive may be, for example, —OH, —NH— or —$NH_2$ groups, particularly preferred are one or more OH groups, more particularly an OH group. In one particularly preferred embodiment, a compound of the general formula (1) comprises precisely one isocyanate-reactive group and more particularly an —OH group. If $R^2$ is —$NH_2$ or —$NHR^3$, the $NH_2$ or the —$NHR^3$ group is not considered to be an isocyanate-reactive group, unless the moiety $R^3$ is a moiety which carries an —OH, —NH— or —$NH_2$ group.

In a further preferred embodiment, $R^2$ is —$NH_2$, —NH—$CH_3$, —$OCH_3$, -alkyl, such as methyl, ethyl or propyl, —N($CH_3$)$_2$, —NH—($C_2H_4$)—OH or —$CH_2$—C(O)—O—$CH_3$, more preferably methyl, ethyl, propyl —$OCH_3$ or —$CH_2$—C(O)—O—$CH_3$, and more preferably —$CH_3$.

The polyetherol or polyamine here which is reacted with the compound of the formula (2) to give a CH-acidic compound (d) is preferably a compound [H—X—(A-O)$_l$-A-X]$_m$—S[X—H]$_p$—[X-(A-O)$_n$-A-X—H]$_o$, where H, X, A, O, S, I, m, n, o and p are as defined above. The compound [H—X—(A-O)$_l$-A-X]$_m$—S[X—H]$_p$—[X—(A-O)$_n$-A-X—H]$_o$ is usually obtained by alkoxylation of conventional starter molecules of the type also used for the production of polyethers. Examples of these starter molecules are ethylene glycol, diethylene glycol, propylene glycol, dipropylene glycol, glycerol, trimethylolpropane, pentaerythritol, sugar derivatives, for example sucrose, hexitol derivatives, for example sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3,-propanediamine, 1,6- hexanediamine, ethanolamine, diethanolamine, triethanolamine, and also other di- or polyhydric alcohols or mono- or polyfunctional amines or mixtures thereof. The starter molecules are preferably glycerol, trimethylolpropane, sorbitol and/or sucrose. If —X— is —NH—, an amine is used as starter molecule or the alkoxylation product is then aminated. These amination reactions are known and are usually carried out by way of example in the production of polyetheramines which can by way of example be used in polyurethane chemistry.

Quantities of component (d) used for the purposes of the present invention are preferably from 0.01 to 5% by weight, particularly preferably from 0.05 to 2% by weight, and in particular from 0.1 to 1% by weight, based on the total weight of component (a) to (f). Component (d) is usually a mixture of compounds of formula (1), where in particular I, m, n, o and p, and also the groups A and S, can vary within the stated limits.

If the intention is that the polyurethane of the invention take the form of polyurethane foam, reaction mixtures of the invention also comprise blowing agent (e). It is possible here to use any of the blowing agents known for the production of polyurethanes. These can comprise chemical and/or physical blowing agents. These blowing agents are described by way of example in "Kunststoffhandbuch [Plastics handbook], volume 7, Polyurethane [Polyurethanes]", Carl Hanser Verlag, $3^{rd}$ edition 1993, chapter 3.4.5. The term chemical blowing agent here means compounds which form gaseous products through reaction with isocyanate. Examples of these blowing agents are water and carboxylic acids. The term physical blowing agents means compounds which have been dissolved or emulsified in the starting materials for the polyurethane production reaction and evaporate under the conditions of formation of polyurethane. These are by way of example hydrocarbons, halogenated hydrocarbons, and other compounds, examples being perfluorinated alkanes such as perfluorohexane, chlorofluorocarbons, and ethers, esters, ketones, acetals, and/or liquid carbon dioxide. Any desired quantity of the blowing agent can be used here. The quantity used of the blowing agent is preferably such that the density of the resultant polyurethane foam is from 10 to 850 g/L, particularly from 20 to 800 g/L, and in particular from 25 to 500 g/L. It is particularly preferable to use blowing agents comprising water.

Chain extenders and crosslinking agents (f) used here can be compounds of molar mass less than 400 g/mol which have at least two groups reactive toward isocyanates, the term chain extenders being used here for molecules having two hydrogen atoms reactive toward isocyanate, and the term crosslinking agent being used here for molecules having more than two hydrogens reactive toward isocyanate. However, it is also possible here to omit the chain extenders or crosslinking agents. Addition of chain extenders, crosslinking agents, or else optionally a mixture thereof can, however, prove to be advantageous for modification of mechanical properties, e.g. hardness.

If chain extenders and/or crosslinking agents (f) are used, use may be made of the chain extenders and/or crosslinking agents known in the production of polyurethanes. These are preferably low-molecular-weight compounds having functional groups reactive toward isocyanates, for example glycerol, trimethylolpropane, glycol, and diamines. Other possible low-molecular-weight chain extenders and/or crosslinking agents are mentioned by way of example in "Kunststoffhandbuch [Plastics handbook], volume 7, Polyurethane [Polyurethanes]", Carl Hanser Verlag, $3^{rd}$ edition 1993, chapter 3.2 and 3.3.2.

It is moreover possible to use auxiliaries and/or additives (g). It is possible here to use any of the auxiliaries and additives known for the production of polyurethanes. Mention may be made by way of example of surface-active substances, foam stabilizers, cell regulators, release agents, fillers, dyes, pigments, flame retardants, hydrolysis stabilizers, fungistatic substances, and bacteriostatic substances. These substances are known and are described by way of example in "Kunststoffhandbuch [Plastics handbook], volume 7, Polyurethane [Polyurethanes]", Carl Hanser Verlag, $3^{rd}$ edition 1993, chapter 3.4.4 and 3.4.6 to 3.4.11.

The quantities of the polyisocyanates (a), the polyols (b), the CH-acidic compound (d) and, if used, the blowing agents (e) and chain extenders, and/or crosslinking agents (f) used in the production of the polyurethane of the invention are generally such that the equivalence ratio of NCO groups of the polyisocyanates (a) to the total number of the reactive hydrogen atoms of components (b), (c), (d), and optionally (e), and (f) is from 0.75 to 1.5:1, preferably from 0.80 to 1.25:1. If the cellular plastics comprise at least some isocyanurate groups, the ratio of NCO groups of the polyisocyanates (a) to the total number of the reactive hydrogen atoms of component (b), (c), (d), and optionally (e) and (f) is usually from 1.5 to 20:1, preferably from 1.5 to 8:1. A ratio of 1:1 here corresponds to an isocyanate index of 100.

The quantitative and qualitative differences between the respective starting materials (a) to (g) for the production of polyurethanes of the invention in the form of thermoplastic polyurethane, flexible foam, semirigid foam, rigid foam, or integral foam are only small: by way of example, the production of compact polyurethanes uses no blowing agents, and thermoplastic polyurethane uses preferably strictly difunctional starting materials. It is moreover possible by way of example to vary the resilience and hardness of the polyurethane of the invention by way of the functionality and the chain length of the relatively high-molecular-weight compound having at least two reactive hydrogen atoms. These modifications are known to the person skilled in the art.

The starting materials for the production of a compact polyurethane are described by way of example in EP 0989146 or EP 1460094, the starting materials for the production of a flexible foam are described by way of example in PCT/EP2005/010124 and EP 1529792, the starting materials for the production of a semirigid foam are described by way of example in "Kunststoffhandbuch [Plastics handbook], volume 7, Polyurethane [Polyurethanes]", Carl Hanser Verlag, $3^{rd}$ edition 1993, chapter 5.4, the starting materials for the production of a rigid foam are described in PCT/EP2005/010955, and the starting materials for production of an integral foam are described in EP 364854, US 5506275, or EP 897402. The CH-acidic compound (d) is then in each case also added to the starting materials described in said document.

The invention provides not only the process of the invention but also a polyurethane obtainable by a process of the invention. The polyurethanes of the invention are preferably used in enclosed spaces, for example as thermal insulation materials in residential buildings, for example insulation for pipes and refrigerators, in furniture construction, for example as decorative elements or as seat cushioning, and also in automobile interiors, for example as steering wheels, dashboards, door cladding, carpet-backing foam, acoustic foams, for example roof linings, and also headrests, or control buttons. Preference is in particular given here to CH-acidic compound having one or more groups reactive toward isocyanates. These permit linking of the CH-acidic compound (d) to the polyurethane skeleton, giving firstly a longer period of effectiveness, specifically a longer period of aldehyde reduction, under demanding conditions, for example high temperatures or insolation, than in the absence of the groups reactive toward isocyanate. Secondly, CH-acidic compounds (d) having incorporable groups or having a molecular weight greater than 300 g/mol, preferably greater than 350 g/mol, still more preferably greater than 450 g/mol and in particular greater than 700 g/mol give polyurethanes which exhibit not only low emission of aldehydes but also in general terms lower emissions of volatile organic compounds. The content of alkylene oxide units likewise increases the compatibility of the compound (d), and this leads to prolonged effectiveness and also to better dispersiblility in the polyurethane and thus improved effectiveness.

The invention will be illustrated below with reference to examples.

Starting materials:

Polyol A: Polyetherol with OH number 28 mg KOH/g and functionality 2.7 based on ethylene oxide and propylene oxide, with propylene oxide content 84% by weight and ethylene oxide content 14% by weight Polyol B: Polyetherol with OH number 250 mg KOH/g and functionality 2.0 based on polyol A (35%), propylene oxide (45%), and dimethylaminopropylamine (20%)

Polyol C: Polyetherol with OH number 250 mg KOH/g and functionality 3.0 based on trimethylolpropane and ethylene oxide, with ethylene oxide content 80% by weight Polyol D: Polyetherol with OH number 490 mg KOH/g and functionality 4.3 based on sucrose, glycerol and propylene oxide, with sucrose content 20% by weight, glycerol content 13% and propylene oxide content 67% by weight TEOA: Triethanolamines Isopur® SU-12021: Black paste from ISL-Chemie Jeffcat® ZF10: Catalyst from Huntsman Jeffcat® DPA: Catalyst from Huntsman Additives A1: Esterification product of one mole of Polyol C (Mw about 670) with 2.5 mol of methyl acetoacetate A2: Esterification product of one mole of Polyol C (Mw about 670) with 3.0 mol of methyl acetoacetate A3: Esterification product of one mole of Polyol D (Mw about 500) with 3.0 mol of methyl acetoacetate A4: Esterification product of one mole of Polyol D (Mw about 500) with 4.0 mol of methyl acetoacetate The additives A1 to A4 here were produced as follows:

A3:

664.7 g of Polyol D, 463.1 g of methyl acetoacetate (CAS 105-45-3) and 40 ppm of titanium tetrabutanolate were charged to a 2 l round-bottomed flask with thermometer, nitrogen inlet, blade stirrer and distillation bridge. The mixture was heated to 130° C. within a period of 30 minutes, with stirring. Within a period of 2 h, the temperature was increased to 170° C., and then allowed to remain at this temperature for 3 hours. The resultant methanol was removed here by distillation. This gave a colorless, liquid product (A3).

The other additives were produced by appropriate changes to the polyol, and also to the quantities of methyl acetoacetate.

Isocyanate A: Mixture of 85 parts of carbodiimide-modified 4,4'-MDI and 15 parts of polymeric diphenylmethane diisocyanate PMDI with NCO content 27.1

The mixture A was produced by mixing the following components:

93.6 parts by weight of polyol A
3.0 parts by weight of polyol B
1.5 parts by weight of TEOA
0.5 parts by weight of Isopur SA-21050
2.3 parts by weight of water
0.4 part by weight of Jeffcat DPA
0.2 part by weight of Jeffcat ZF10
0.5 part by weight of compounds A1 to A4 of table 1

The mixture A and the isocyanate component A, and also the additives of table 1, were mixed with one another with an isocyanate index of 100, and charged to a closed mold to give moldings with an average density of 160 g/L.

Formaldehyde was determined by a procedure based on ASTM D5116-06. The size of the chamber was 4.7 liters. The polyurethane samples used were pieces measuring 110 mm×100 mm×25 mm. When molded foams were tested, parts made of the interior of the foam were used. The temperature of the test chamber during the test was 65° C., and the relative humidity was 50%. The air replacement rate was 3.0 liters per hour. The exhaust air stream with volatile aldehydes from the polyurethane was passed through a cartridge with 2,4-dinitrophenylhydrazine-coated silica during 120 minutes. The DNPH cartridge was then eluted with a mixture of acetonitrile and water. The concentration of formaldehyde of the eluate was determined by means of HPLC. The detection limit for formaldehyde emissions for this setup is ≤11 µg/m$^3$.

Table 1: formaldehyde values determined in the chamber for semirigid foams without addition of additives (reference), and also with addition of the respective additives A1 to A4 as in the respective concentrations stated in parts by weight, based on the total weight, of the mixture A.

TABLE 1

|  | Conc. in A | Formaldehyde (µg/m$^3$) |
|---|---|---|
| Reference | — | 936 |
| A1 | 0.50% | 337 |
| A2 | 0.50% | 330 |
| A3 | 0.50% | 129 |
| A4 | 0.50% | 124 |

The invention claimed is:

1. A process for the production of polyurethanes, the process comprising:
   mixing the following compounds to produce a reaction mixture:
   (a) polyisocyanate,
   (b) polymeric compounds having groups reactive toward isocyanates, the polymeric compounds being selected from the group consisting of polyether polyols, polyester polyols, and mixtures thereof with functionality from 2 to 8 and with number-average molar mass from 400 to 15000 g/mol,
   (c) catalysts,
   (d) a CH-acidic compound of the general formula (1):

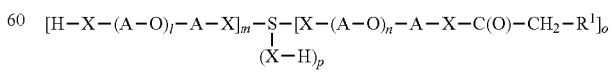

formula (1)

wherein

H— is hydrogen,

—X— is mutually independently one of oxygen and a —NH— group,

-A- is mutually independently one of a linear-chain aliphatic, branched-chain aliphatic, and aromatic hydrocarbon moiety having from 2 to 20 carbon atoms,
—O— is oxygen,
S is one of an aliphatic, cycloaliphatic, aromatic, linear-chain hydrocarbon, and branched-chain hydrocarbon moiety which can have substitution, —C(O)— is a carbonyl moiety,
—CH$_2$— is a methylene moiety,
R$_1$ is mutually independently one of NO$_2$ and an electron-withdrawing moiety of a general formula —C(O)—R$^2$, and R$^2$ is mutually independently a moiety selected from the group consisting of H, —NH$_2$, —NH—R$^3$—NR$^4$R$^5$, OR$^6$ and R$^7$, wherein R$^3$, R$^4$, R$^5$, R$^6$ and R$^7$ independently are selected from the group consisting of aliphatic, araliphatic, and aromatic hydrocarbons, and
l and n are mutually independently integers from 0 to 200,
m is an integer from 0 to 7,
o is an integer from 1 to 8, and
p is an integer from 0 to 7,
wherein the sum of m, o and p is not greater than 8; and
allowing the reaction mixture to complete a reaction to produce the polyurethane.

2. The process according to claim 1, wherein -A-O— is respectively mutually independently one of a ring-opened ethylene oxide and a ring-opened propylene 1,2-oxide.

3. The process according to claim 1, wherein the CH-acidic compound (d) is obtained through esterification of one of a polyetherol and amidation of a polyetheramine with a compound of formula (2):

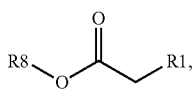

formula (2)

wherein R1 is as defined in claims 1 and R8 is one of a methyl moiety, an ethyl moiety, and a propyl moiety.

4. The process according to claim 3, wherein the one of the polyetherol and polyetheramine is one of a polyetherol and polyetheramine of a general formula [H—X—(A-O)$_l$-A-X]$_m$—S[X—H]$_p$ —[X—(AO)$_n$-A-X—H]$_o$, wherein, in the general formula, H, X, A, 0, S, l, m, n, o and p are as defined in claim 1.

5. The process according to claim 4, wherein the one of the polyetherol and polyetheramine of the general formula [H—X—(A-O)$_l$-A-X]$_m$—S[X—H]$_p$—[X—(AO)$_n$-A-X—H]$_o$ is obtained through at least one of alkoxylation of glycerol, trimethylolpropane, sorbitol, and sucrose.

6. The process according to claim 1, wherein the moieties R$^4$, R$^5$, R$^6$, R$^7$, and R$^8$ are each selected independently of one another from the group consisting of aliphatic hydrocarbons having from 1 to 15 carbon atoms.

7. The process according to claim 1, wherein the moieties R$^4$, R$^5$, R$^6$, and R$^7$ are respectively mutually independently moieties that comprise, as substituent, one or more groups reactive toward isocyanate.

8. The process according to claim 1, wherein the moiety R$^1$ is an acetyl group.

9. The process according to claim 1, wherein a portion of the reaction mixture comprised of the component (d), based on a total weight of the components (a) to (f), is from 0.01 to 5% by weight.

10. The process according to claim 1, wherein the compounds (b) having groups reactive toward isocyanates comprise polyetherols.

11. The process according to claim 1, wherein the compounds (c) comprise incorporable amine catalysts.

12. The process according to claim 11, wherein compounds used as incorporable catalysts have one or more tertiary aliphatic amino groups.

13. The process according to claim 12, wherein one or more tertiary amino group bears two moieties selected mutually independently from methyl and ethyl moiety, and bears another organic moiety.

14. The process according to claim 1, wherein the mixing further comprises mixing at least one of a blowing agent, chain extender, crosslinking agent, auxiliaries, and additives are mixed to produce the reaction mixture.

15. The process according to claim 4, further comprising a subsequent amination step.

* * * * *